UNITED STATES PATENT OFFICE.

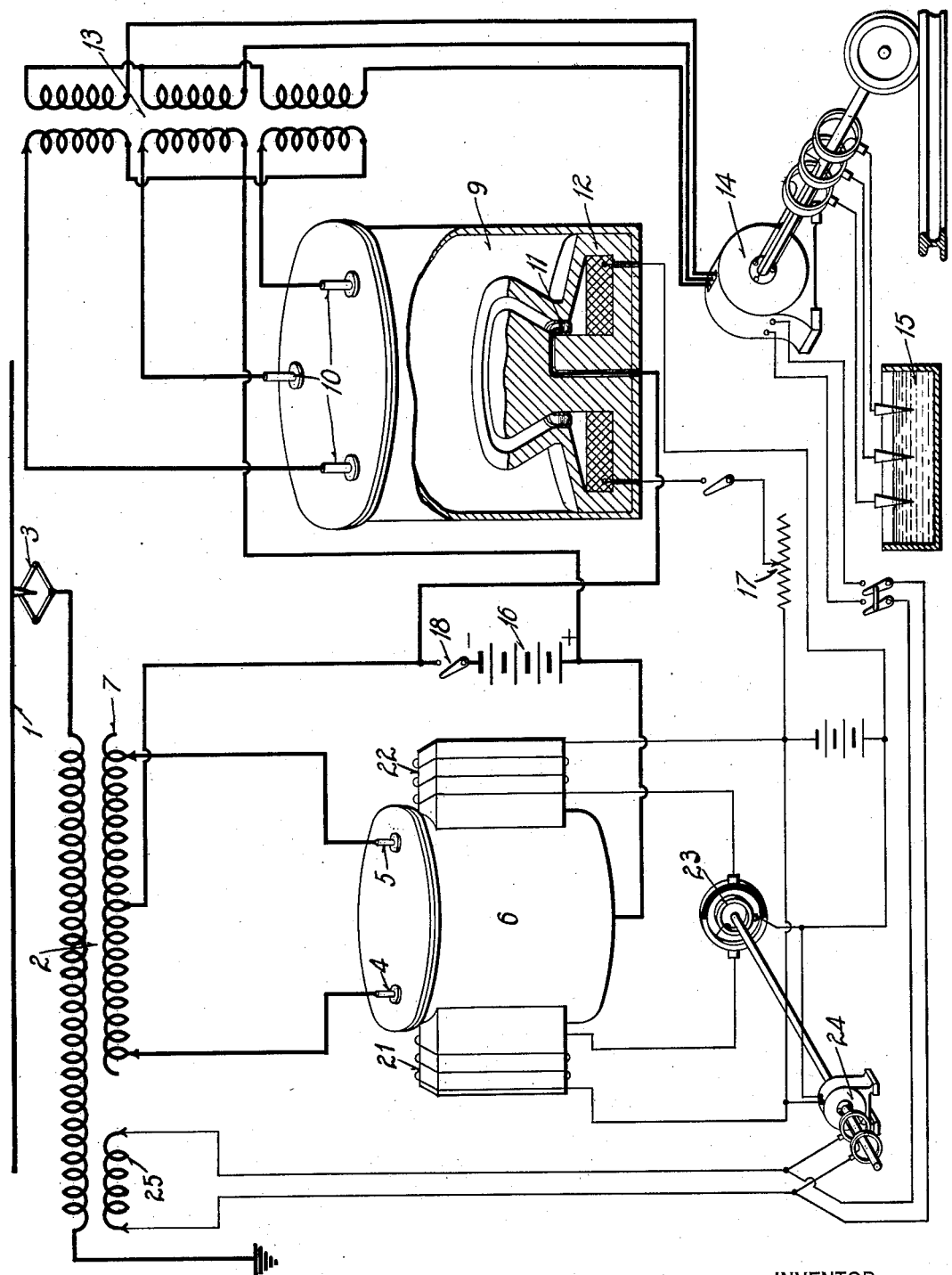

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,275,968.　　　　　Specification of Letters Patent.　　Patented Aug. 13, 1918.

Application filed March 24, 1915. Serial No. 16,682.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Systems of Distribution, of which the following is a specification.

My invention relates to electric railway systems, and it has for its object to provide circuits and apparatus whereby a vehicle may be accelerated in a smooth and simple manner and whereby regeneration may be readily effected when coasting or accelerating.

The single figure of the accompanying drawing is a diagrammatic view of the electrical equipment of an electrical vehicle constructed and arranged in accordance with my invention.

In the operation of electric railway systems, the use of a single-phase high-voltage line is desirable for economical transmission. Single-phase alternating-current motors, however, are ill adapted for vehicle propulsion because of their poor starting characteristics, and various systems have been developed, therefore, for the conversion of the single-phase supply into polyphase current for the energization of polyphase propulsion motors. A well known example of a system of this character is that employing a rotary phase splitter. By my invention, I do away with the somewhat heavy and cumbersome rotary phase splitter, replacing it by light and stationary vapor apparatus, at the same time preserving the valuable features of flexible control and regeneration found in the ordinary phase-splitting system of the present day. Briefly stated, my invention embodies the conversion of the single-phase supply into unidirectional current by a rectifier, preferably of the vapor type, the supply of said unidirectional current to a de-rectifier, also preferably of the vapor type, and reconversion into polyphase current for supply to a polyphase vehicle motor.

It is well known that the instantaneous power of a single-phase system is intermittent, whereas that of a polyphase system is constant. It, therefore, becomes necessary to provide auxiliary means for supplying energy to the polyphase system during periods of deficiency in the single-phase supply. For this purpose, I float an energy-storing device, such, for example, as an ordinary storage battery, across the circuit connecting the rectifier and the de-rectifier, said battery absorbing energy from the single-phase system during periods of excess instantaneous energy therein and supplying said current to the polyphase system at times of instantaneous deficiency in the single-phase supply. Furthermore, in order that I may be able to regenerate, both of the above-mentioned vapor converting devices are reversible in function; that is, polyphase current, given out by the motor acting as an asynchronous generator, may be rectified in the apparatus normally employed as a de-rectifier and transmitted to the device previously operating as a rectifier for reconversion in single-phase current to be supplied to the line.

For a more detailed understanding of my invention, reference may be had to the drawing wherein single-phase alternating current from a line 1 is supplied to a transformer 2 by a suitable contact device 3. Current is supplied to the two anodes 4 and 5 of a rectifier 6, preferably of the vapor-arc type, from a secondary winding 7 of the transformer 2. A de-rectifying device 9, preferably of the vapor-arc type as described and claimed in my copending application, Serial No. 16,680, filed Mar. 24, 1915, and assigned to the Westinghouse Electric & Manufacturing Company, is mounted adjacent to the rectifier 6 and comprises a plurality of anodes 10—10 disposed opposite a single-trough shaped, cathode 11. An arc between the anode 10—10 and the cathode 11 may be rotated by a suitable magnetic field produced by a magnet 12 embracing the cathode 11. A three-phase transformer 13 is associated with the converter 9 and has its primary windings connected to the anodes thereof, as is usual in rectifier practice. The secondary windings of the transformer 13 are connected to the primary member of a vehicle motor 14 of the polyphase induction type and the motor 14 may, if desired, be provided with a wound secondary rotor for connection with a liquid rheostat 15 for speed control. The mid-point of the secondary winding 7 is connected to the cathode 11, and the mid-point of the primary windings of the transformer 13 is connected to the cathode of the rectifier 6. An energy-storing device, such, for example, as a storage battery 16, is inserted between these last two mentioned connecting wires for a purpose to be hereinafter pointed out. In normal operation, current is supplied from the secondary winding 7 to the device 6, is there rectified and supplied to the midpoint of the primary windings of the transformer 13, whence it flows to the anodes 10—10 of the device 9, to the cathode 11, and thence returns to the mid point of the secondary winding 7. The rotation of the arc within the device 9 by the magnetic field of the member 12 causes it to sweep over each of the anodes 10 in succession, permitting periodic current flow in each of the primary windings of the transformer windings 16 and inducing alternating current in the secondary windings thereof, as is well known in the art. The alternating current thus produced is supplied to the motor 14. The speed of the motor 14 may be varied by altering the frequency of the supply from the transformer 13 through changes in the velocity of the arc movement within the device 9, brought about by changes in the magnet field of the device 12, which may be regulated by a suitable rheostat 17. During the above-described operation, the battery 16 is inserted across the circuit connecting the converters 6 and 9 by closing a suitable switch 18 and, during periods when the instantaneous voltage of the secondary winding 7 exceeds the effective voltage of the primary windings of the transformer 13, energy will be imparted thereto. When, on the other hand, the instantaneous voltage of the secondary winding 7 falls below the effective voltage of the polyphase system, said battery will give out energy to the polyphase system. The battery 6 may be termed an electrical supply wheel.

When, in coasting, it is desired to regenerate, the motor 14 may derive exciting current for operation as an induction generator, either from the de-rectifier 9 or from a special exciting machine, as is common in the art. Polyphase current flowing to the transformer 13 is supplied to the converter 9, now operating as an ordinary rectifier, and thence passed to the converter 6 in the form of unidirectional current. The anodes 4 and 5 in the device 6 are provided with attendant magnets 21 and 22 arranged to be periodically excited from a rotating switch 23 driven by a synchronous motor 24 supplied from a secondary winding 25 on the transformer 2, all as described and claimed in my co-pending application, Serial No. 846,365, filed June 20, 1914, and assigned to the Westinghouse Electric & Manufacturing Company. By the joint action of the anodes 4 and 5 and the magnets 21 and 22 the unidirectional current from the converter 9 is caused to flow as pulsating current in each half of the secondary winding 7, inducing alternating current in the primary winding of the transformer 2 for supply to the line. As the supply of energy from the polyphase system is substantially uniform, whereas the supply of energy to the line is intermittent, the energy-storing and restoring action of the battery 16 is unnecessary during regeneration, and the switch 18 may therefore be opened at such times.

While I have described the use of a storage battery as the energy-storing device for permitting the derivation of a polyphase current from a single-phase supply, I may, under certain conditions, substitute therefor other well known storing devices, such, for example, as condensers.

While I have shown my invention in several embodiments, it will be apparent to those skilled in the art that it is susceptible of various minor changes and modifications without departing from the spirit thereof and I desire, therefore, that no limitations shall be placed thereupon except such as are imposed by the prior art or are specifically set forth in the appended claims.

I claim as my invention:

1. In an electric distributing system, the combination with a single-phase source, of a rectifier, a de-rectifier, a battery, and a polyphase motor, so connected that energy from said line is rectified in said rectifier, is reconverted into polyphase current in said de-rectifier, energy being derived from said battery during times of deficient energy in the single-phase system, and is delivered to said motor.

2. In an electric distributing system, the combination with a single-phase source, of a single-phase rectifier energized therefrom, a polyphase de-rectifier receiving unidirectional current from said rectifier, a polyphase motor deriving energy from said de-rectifier, and a battery connected to supply energy to said de-rectifier when the instantaneous voltage of said unidirectional current is below the effective voltage of the de-rectifier output.

3. In an electric distributing system, the combination with a single-phase source, of a single-phase rectifier energized therefrom, a polyphase de-rectifier receiving unidirectional current from said rectifier, a polyphase motor deriving energy from said de-rectifier, and a battery connected to supply energy to said de-rectifier when the instantaneous voltage of said unidirectional current is below the effective voltage of the de-rectifier output and to derive energy from said unidirectional current when the instantaneous voltage thereof exceeds its own voltage.

4. In an electric distributing system, the combination with a single-phase source, of a single-phase rectifier energized therefrom, a polyphase de-rectifier receiving unidirectional current from said rectifier, a polyphase motor deriving energy from said de-rectifier, and a battery connected to float across the circuit connecting said rectifier and said de-rectifier for supplying energy to said polyphase system during instantaneous periodic deficiencies in the energy of said single-phase supply.

5. A system for transferring energy from a single-phase line to a polyphase line comprising a rectifier adapted for connection to a single-phase line, a polyphase de-rectifier adapted for connection to a polyphase line, a unidirectional current circuit connecting said rectifier and said de-rectifier, and a battery floating across said circuit.

6. In an electrical distributing system, the combination with a single-phase source, of a mechanical load capable of either absorbing or giving out energy, a combined single-phase rectifier and de-rectifier, a combined polyphase rectifier and de-rectifier, a polyphase motor coupled to said load, and an energy-storing device, all of said elements being so connected that, in normal operation, said single-phase converting device delivers unidirectional current to said polyphase converting device for supply to said polyphase motor as polyphase current, said energy-storing device operating to tide over instantaneous periods when the energy supply of said single-phase system is less than the polyphase demand, and so that, in regenerating, said motor supplies polyphase current to said polyphase converting device for conversion into unidirectional current for supply to said single-phase converting device where it is de-rectified for supply to said single-phase line.

In testimony whereof I have hereunto subscribed my name this 12th day of March, 1915.

FRIEDRICH W. MEYER.

Witnesses:
   D. C. DAVIS,
   B. B. HINES.